US010664316B2

(12) United States Patent
Murugan et al.

(10) Patent No.: US 10,664,316 B2
(45) Date of Patent: May 26, 2020

(54) PERFORMING A COMPUTATION USING PROVENANCE DATA

(71) Applicant: HEWLETT PACKARD ENTERPRISE DEVELOPMENT LP, Houston, TX (US)

(72) Inventors: Muthukumar Murugan, Boulder, CO (US); Suparna Bhattacharya, Bangalore (IN); Douglas L. Voigt, Boise, ID (US); Ancy Sarah Tom, Minneapolis, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 266 days.

(21) Appl. No.: 15/473,894

(22) Filed: Mar. 30, 2017

(65) Prior Publication Data

US 2018/0217883 A1  Aug. 2, 2018

(30) Foreign Application Priority Data

Jan. 31, 2017  (IN) .............................. 201741003616

(51) Int. Cl.
    *G06F 9/54*    (2006.01)
    *G06F 9/48*    (2006.01)
    *G06F 9/50*    (2006.01)

(52) U.S. Cl.
    CPC ................... *G06F 9/5033* (2013.01)

(58) Field of Classification Search
None
See application file for complete search history.

(56) References Cited

U.S. PATENT DOCUMENTS

| | | |
|---|---|---|
| 8,190,633 B2 | 5/2012 | Freire et al. |
| 8,700,678 B1 | 4/2014 | Fan et al. |
| 8,818,962 B2 | 8/2014 | Mandagere et al. |
| 9,307,048 B2 | 4/2016 | Kandula et al. |
| 9,323,805 B2 | 4/2016 | John et al. |
| 9,477,523 B1 | 10/2016 | Warman et al. |

(Continued)

FOREIGN PATENT DOCUMENTS

WO    20171204819 A1    11/2017

OTHER PUBLICATIONS

Agarwal et al., "BlinkDB: Queries with Bounded Errors and Bounded Response Times on Very Large Data", Proceedings of the 8th ACM European Conference on Computer Systems, 2013, pp. 29-42.

(Continued)

*Primary Examiner* — Umut Onat
(74) *Attorney, Agent, or Firm* — Hewlett Packard Enterprise Patent Department

(57) ABSTRACT

Example implementations relate to performing computations using provenance data. An example implementation includes storing first lineage data of a first dataset and provenance data of an application operating on the first dataset in a storage system. A computing resource may determine whether second lineage data of a second dataset meets a similarity criterion with the first lineage data of the first dataset. A computation on the second dataset may be performed using the provenance data of the application, and an insight of the second dataset may be generated from the performed computation.

20 Claims, 10 Drawing Sheets

(56) References Cited

U.S. PATENT DOCUMENTS

| | | | |
|---|---|---|---|
| 2009/0204507 A1* | 8/2009 | Cockayne | G06N 5/02 705/26.1 |
| 2012/0166378 A1 | 6/2012 | Valerio et al. | |
| 2015/0356123 A1* | 12/2015 | Gorelik | G06F 16/2465 715/765 |
| 2016/0162521 A1 | 6/2016 | Pradhan et al. | |
| 2016/0171374 A1* | 6/2016 | Kim | G06N 5/04 706/46 |
| 2017/0139929 A1* | 5/2017 | Aggarwal | G06F 16/2471 |
| 2017/0300561 A1 | 10/2017 | Kannan et al. | |
| 2018/0218384 A1* | 8/2018 | Cook | G06F 16/252 |
| 2018/0276290 A1 | 9/2018 | Bhattacharya et al. | |

OTHER PUBLICATIONS

Alluxio, "Open Source Memory Speed Virtual Distributed Storage", available online at <https://web.archive.org/web/20161229071653/http.www.alluxio.org/>, 2016, 5 pages.

Cohesity Inc., "Secondary Storage Data Consolidation", available online at <https://web.archive.org/web/20161217212850/http://www.cohesity.com/>, Dec. 17, 2016, 11 pages.

DataGravity, "DataGravity," available online at <https://web.archive.org/web/20161204071435/https://datagravity.com/>, Dec. 4, 2016, 6 pages.

DataGravity, "DataGravity for Virtualization", available online at <https://web.archive.org/web/20161023173751/http://datagravity.com/content/product-datagravity-virtualization>, Oct. 23, 2016, 4 pages.

DataGravity, "Secure Your Sensitive Data", available online at <https://web.archive.org/web/20161023175530/http://datagravity.com/content/use-case-sensitive-confidential-data>, Oct. 23, 2016, 4 pages.

Goiri et al., "Approxhadoop: Bringing approximations to mapreduce frameworks", Proceedings of the ACM International Conference on Architectural Support for Programming Languages and Operating Systems, 2015, 15 pages.

Gunda et al., "Nectar: automatic management of data and computation in datacenter", Proceedings of the 9th USENIX conference on Operating systems design and implementation, 2010, 14 pages.

HGST, "Innovation Center", available online at <http://www.archive.org/web/20161119 1659/http.//www.hgst.com/company/innovation-center>, 2016, 3 pages.

Joyent Manta, "Object Storage as a Service, made Simple, Scalable, and Portable", available online at <https://web.archive.org/web/20170107021754/https://www.joyent.com/manta>, 2017, 5 pages.

Sampson et al., "Approximate storage in solid-state memories", Proceedings of the 46th Annual IEEE/ACM International Symposium on Microarchitecture, 2013, 12 pages.

Sim et al., "Analyzethis: an analysis workflow-aware storage system", Proceedings of the International Conference for High Performance Computing, Networking, Storage and Analysis, 2015, 12 pages.

Sorrel, "Hitachi Wireless Hard Drive Streams Media Direct to Phones, Tablets", available online at <https://www.wired.com/2011/06/hitachi-wireless-hard-drive-streams-media-direct-to-phones-tablets/>, Jun. 22, 2011 3 pages.

The Apache Software Foundation, "Apache Spark-Lightning-Fast Cluster Computing", available online at <https://web.archive.org/web/20161229071653/http://spark.apache.org/>, 2016, 4 pages.

Zhang et al., "Impression store: compressive sensing-based storage for big data analytics", Proceedings of the 6th USENIX conference on Hot Topics in Cloud Computing, 2014, 6 pages.

Apache, "Spark Programming Guide," Spark 1.6.1 Documentation, retrieved Apr. 2, 2016, <http://spark.apache.org/docs/latest/programmingguide.html>, 17 pages.

* cited by examiner

PERFORMING A COMPUTATION USING PROVENANCE DATA

BACKGROUND

Technological advancements continue to ensure the generation and storage of increasingly large datasets. Storage systems continue to increase in scale to accommodate the storage of these datasets. Analytics applications process the data stored in storage systems and derive insights from the stored data.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

The computational resources available in a storage system may be utilized for alleviating computational processing within an application layer and making efficient data placement decisions within the storage system. Specifically, provenance information of an application, as well as lineage data from a dataset, may be utilized by computational resources within a storage layer to predict the computations an application may implement and generate insights to provide to the application. Lineage data of a generated insight may also be assigned a confidence value within a storage system based on a determined value of the lineage data. From the determined value of the lineage data, the computational resources available in the storage system may place the insight in a more or less expensive storage tier.

In the following description, for purposes of explanation, numerous specific details are set forth in order to provide a thorough understanding of the present systems and methods. For some examples, the present systems and methods may be practiced without these specific details. Reference in the specification to "an example" or similar language means that a particular feature, structure, or characteristic described in connection with that example is included as described, but may not be included in other examples. In other instances, methods and structures may not be described in detail to avoid unnecessarily obscuring the description of the examples. Also, the examples may be used in combination with each other.

The following terminology is understood to mean the following when recited by the specification or the claims. The singular forms "a," "an," and "the" mean "one or more." The terms "including" and "having" are intended to have the same inclusive meaning as the term "comprising."

Figure 1:
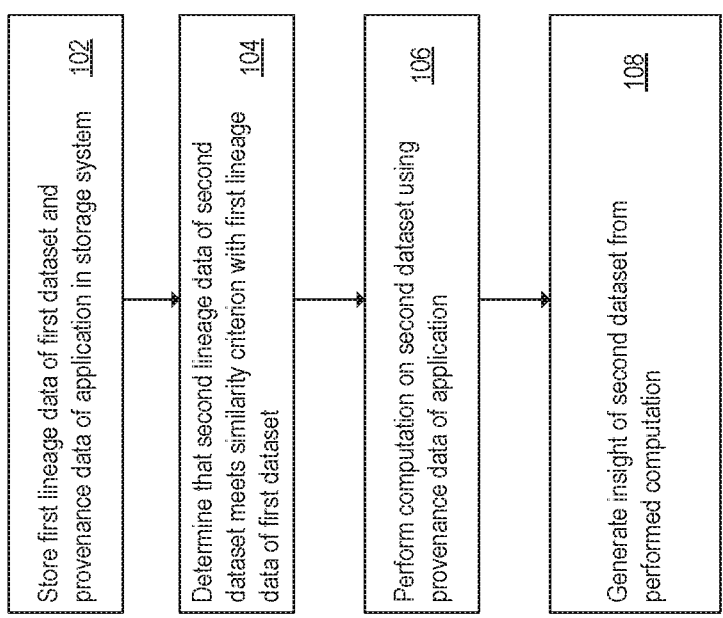
FIG. 1 is a flowchart illustrating a method according to some examples.

FIG. 1 is a flowchart 100 illustrating an example method for generating an insight using provenance data of an application. The method may be implemented in the form of executable instructions stored on a computer-readable medium or in the form of electronic circuitry or any combination thereof. For example, method 100 may be implemented by the instructions executable by the processor of FIG. 10 executing the instructions of the system memory, by the processor of the non-transitory computer-readable medium illustrated in FIG. 7, or by a combination thereof. The sequence of operations described in connection with FIG. 1 is not intended to be limiting, and an implementation consistent with the example of FIG. 1 may be performed in a different order than the example illustrated. Additionally, operations may be added or removed from the method 100.

At block 102, first lineage data of a first dataset is stored within a storage system. Additionally, provenance data of an application operating on the first dataset may be stored within the storage system. In an example, the stored provenance data may include information as to the operations an application performs, or the storage path in which an application receives input or produces output. For instance, the stored provenance data may include a series of workflow operations of the application, a location of the series of workflow operations of the application, the origin of an inputted dataset, the location of a first insight generated by an application workflow operating on the first dataset, etc.

Provenance data of an application may also include further details about the application, including, the format in which the application ingests data, a tolerable error margin the application analyzing the dataset may accept, or a method of the application to compute the error of data. An error metric of the application may also be included in provenance data, where the error metric tunes and validates model parameters during data testing. For instance, an error metric may be application dependent, and may be a difference between an estimated value and an actual value of a generated insight, a mean squared error of an estimated vector as compared to a generated insight, etc. In an example, a storage layer may store provenance data of multiple applications, each having a respective error metric.

Lineage data may be a subset of provenance data and may include information about how a dataset was generated, the structure of a dataset, the processing that may performed on a dataset, etc. In an example, lineage data may also include a type of the dataset, e.g. the extension of a data file, whether the data is image data, text data, time series data, etc. Lineage data of a first dataset may include, for example, an origin of the first dataset, a workflow applied to the first dataset, or a storage path of the first dataset, e.g. where the dataset was stored prior to a workflow being applied to the first dataset and where the dataset was stored subsequent to the workflow being applied to the first dataset.

At block 104, a computing resource collocated within the storage system may determine that second lineage data of a second dataset meets a similarity criterion with the lineage data of the first dataset. In an example, a computing resource may be collocated within the storage system where compute and storage processes may be located within the same hardware, e.g. within the same hard disk, solid state drive, etc. The similarity criterion may be, for example, the first dataset and the second dataset sharing an origin. For instance, the similarity criterion may be met where the first dataset and the second dataset were derived from the same source. Alternatively, the similarity criterion may be met where the first dataset and the second dataset had been operated on by a common workflow, or any number of like operations. As another example, the similarity criterion may be met where the first dataset and the second dataset share a similar storage path, e.g. were pulled from a common resource space, or are directed to be stored in a common resource space. As yet another example, the similarity criterion may be met where the first dataset and the second dataset have a similar structure, or the processing that may be performed to transform and/or analyze the dataset is similar. In another example, the similarity criterion may be met where the first dataset and the second dataset are of the same type.

By determining that the lineage data of the first dataset meets a similarity criterion with the lineage data of the second dataset, the storage system may predict that the application operating on the first dataset will attempt to operate on the second dataset. From this prediction, the storage system may proactively perform a computation on the second dataset to generate an insight of the second dataset for the application. In an example, a proactive computation may be a computation performed without being prompted to do so by a request from an application layer, such as a request from an application. At block 106, a computation on the second dataset is performed using the stored provenance data of the application. In an example, the computation on the second dataset is a workflow, such as a series of workflow operations, of the application applied by the application to the first dataset. Therefore, the same workflow applied to the first dataset may be applied to the second dataset within the storage system.

The output of a workflow operation as applied to a dataset may take the form of an insight generated from the dataset. At block 108, an insight of the second dataset may be generated from the performed computation on the second dataset. In an example, the generated insight may be an output of the performed computation, such as an output of the second dataset as operated on by a series of workflow operations of the application. For example, the series of workflow operations may be a series of transformations applied to the second dataset to transform the second dataset. The generated insight of the second dataset may be stored within the storage system. In an example, third lineage data of the generated insight of the second dataset may also be stored within the storage system.

Figure 2:
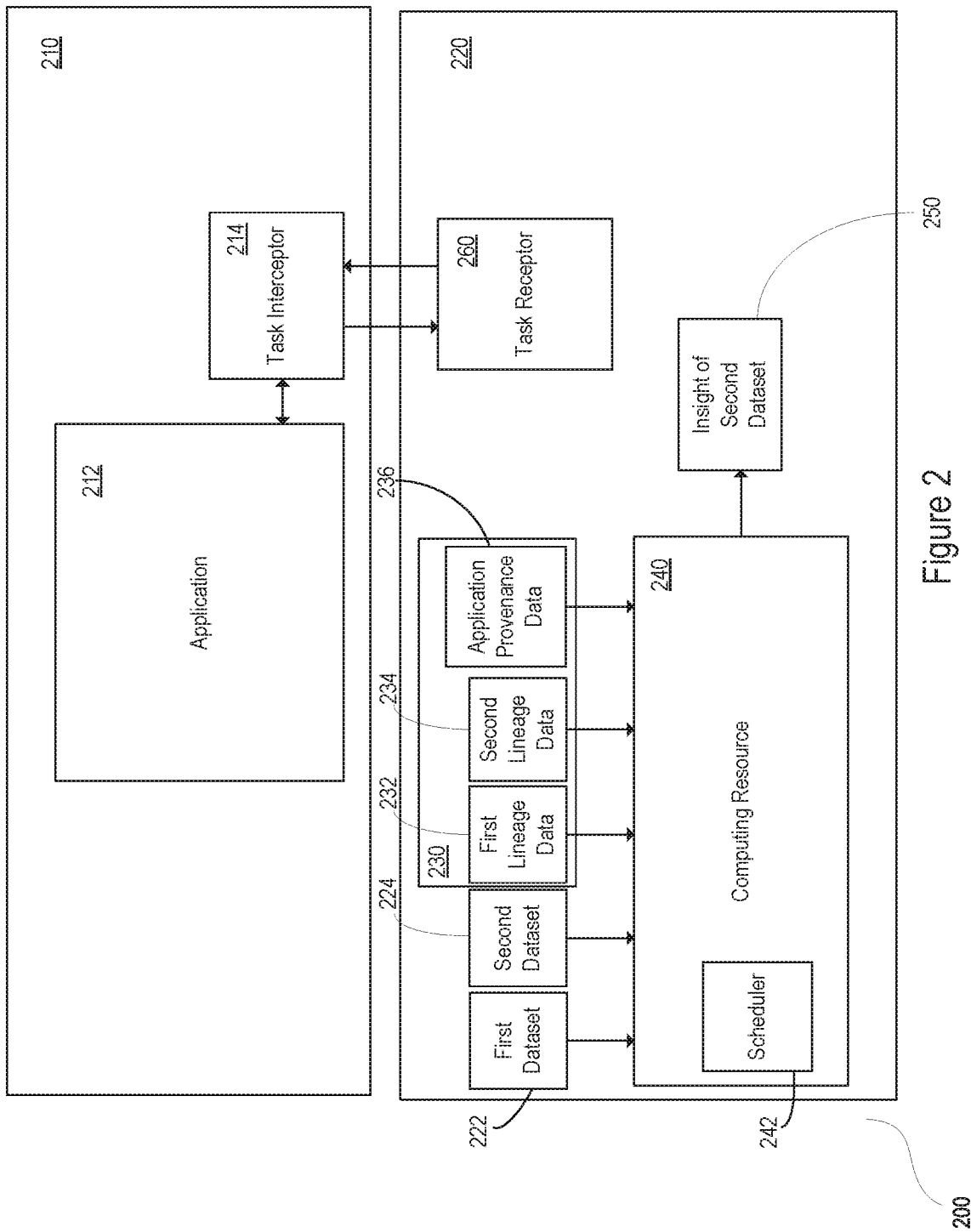
FIG. 2 is a block diagram illustrating a system according to some examples.

FIG. 2 is an example system 200 for generating an insight within a storage layer. A storage layer may be a resource space for retaining data, including persistent data. In an example, a storage layer may have less computational resources than an application layer but may be located closer to stored data than the application layer. An example storage layer 220 is provided, having computing resource 240. Storage layer 220 may be in communication with an application layer, such as application layer 210. In an example, storage layer 220, unlike application layer 210, may store persistent data by storing the data in non-transient memory. Computing resource 240 may be within storage layer 220, as illustrated, or computing resource 240 may be collocated with storage layer 220, or a combination thereof.

In examples described herein, a computing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, the at least one computing resource 240 may fetch, decode, and execute instructions stored within storage layer 220, or any non-transitory computer readable medium, to perform the functionalities described in relation to instructions stored within storage layer 220.

Computing resource 240 may ingest and/or perform computations on data within storage layer 220, including first dataset 222, first lineage data 232, second dataset 224, second lineage data 234, and provenance data 236 of application 212. In an example, metadata, such as first lineage data 232 and second lineage data 234 of first dataset 222 and second dataset 224 respectively, as well as application provenance data 236, may be stored within an allocated resource of storage layer 220, such as metadata store 230. Computing resource 240 may ingest data from metadata store 230 and using this ingested data, computing resource 240 may generate an insight of the second dataset 250.

In an example, computing resource 240 ingests second dataset 224, and predicts whether application 212 will attempt to operate on second dataset 224. Specifically, computing resource 240 may determine whether second lineage data 234 of second dataset 224, meets a similarity criterion with first lineage data 232 of first dataset 222. First lineage data 232 and second lineage data 234 may indicate an origin of first dataset 222 and second dataset 224 respectively. Where first dataset 222 and second dataset 224 share a common origin, the similarity criterion may be met. Alternatively, first lineage data 232 and second lineage data 234 may indicate from what source first dataset 222 and second dataset 224 were derived from. In an example, the similarity criterion may be met where first dataset 222 and second dataset 224 were derived from a common source.

As an additional example, first lineage data 232 and second lineage data 234 may indicate a workflow having operated upon first dataset 222 and second dataset 224 respectively. The similarity criterion may be met where first dataset 222 and second dataset 224 had been operated on by a common workflow, or any number of like operations. As another example, first lineage data 232 and second lineage data 234 may indicate a storage path of first dataset 222 and second dataset 224 respectively. The similarity criterion may be met where the first dataset and the second dataset share a similar storage path, e.g. were pulled from a common resource space, are directed to be stored in a common resource space, etc. As yet another example, the similarity criterion may be met where the first dataset and the second dataset have a similar structure, or the processing that may be performed to transform and/or analyze the dataset is similar. The similarity criterion may also be met where the first dataset and the second dataset share a type, such as a like file extension. The similarity criterion may be based on any number or any combination of the example criteria listed above. For instance, the similarity criterion may be met where first dataset 222 and second dataset 224 both share a common origin and common storage path. By determining whether first dataset 222 and second dataset 224 share a similarity criterion, a prediction can be made as to whether application 212 will likely attempt to perform a computation on second dataset 224.

Where it is determined that first dataset 222 and second dataset 224 share a similarity criterion, computing resource 240 may proactively operate on second dataset 224 and generate an insight from second dataset 224 that application 212 may later attempt to generate. Specifically, computing resource 240 may use provenance data 236, which may include a series of workflow operations, to operate on second dataset 224 and generate an insight of the second dataset 250. In an example, the proactive operation is an operation performed without being prompted to do so by a request from an application layer, such as a request from an application. In an example, the series of workflow operations may be code executable by a processor. The executable code may be stored and accessed from metadata store 230, or the location of the executable code may be stored within metadata store 230, or any combination thereof.

Provenance data 236 may be provenance data of application 212. In an example, scheduler 242 of computing resource 240 uses provenance data 236 to predict what operations application 212 may attempt to perform on second dataset 224. For example, provenance data 236 may include a first series of workflow operations application 212 performed on first dataset 222. Because application 212 performed a first series of workflow operations on first dataset 222, and first lineage data 232 of first dataset 222 shares a similarity criterion with second lineage data 234 of second dataset 224, scheduler 242 of computing resource 240 can predict that application 212 will apply the first series of workflow operations on second dataset 224. Thus, scheduler 242 may instruct computing resource 240 to proactively perform the first series of workflow operations on second dataset 224 to generate an insight of the second dataset 250 that application 212 may attempt to generate within application layer 210.

As illustrated in system 200, provenance data 236 of application 212 may be stored within storage layer 220. In an example, task receptor 260 may receive provenance data 236 of application 212 from application layer 210. Task interceptor 214 may be employed within application layer 210 to retrieve provenance data from application 212 and pass the provenance data down to the storage layer e.g. through task receptor 260. In an example, task interceptor 214, may be native to application 212 or may be installed as a plugin within the application framework of application 212.

Figure 3:
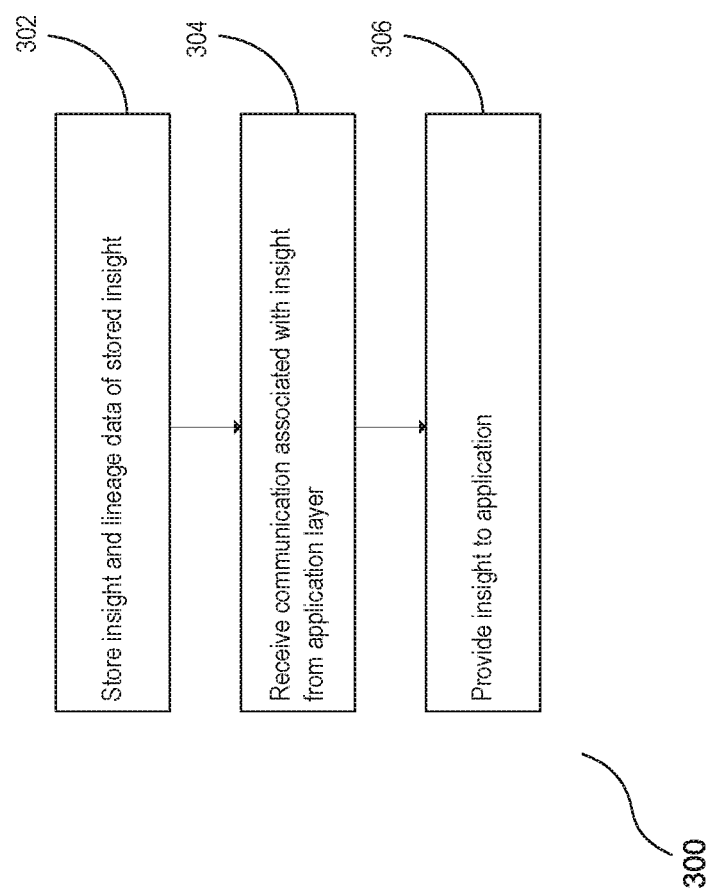
FIG. 3 is a flowchart further illustrating a method according to some examples.

Task receptor 260 may also pass information, such as insight of second dataset 250, from storage layer 220 to application layer 210. FIG. 3. is an example method 300 for providing an insight from storage to an application within an application layer. Example method 300 may be implemented at least by a processor executing instructions on a computer readable storage medium. As previously described, an insight may be generated within a storage layer by performing a proactive computation on a dataset using provenance data of an application within an application layer. The generated insight may be an output of the performed computation, such as an output of the second dataset as operated on by a series of workflow operations of the application. At block 302, the generated insight may be stored within a storage layer. In an example, lineage data of the generated insight may also be stored within the storage layer, e.g. in metadata store 230 as described in FIG. 2.

In an example, an application residing in an application storage layer may request to perform a computation on a dataset to generate an insight. The request of the application may be passed down to the storage layer. If the insight has already been proactively computed within the storage layer, the proactively computed insight may be returned to the application. For example, at block 304, a communication associated with the insight may be received from the application layer. The received communication may be provenance data of the application, such as a series of workflows for operating on the dataset. The received communication may also be a communication intercepted from the application layer, e.g. by a task interceptor residing in the application layer. In an example, the communication may take the form of instructions of the application to perform the workflow operations on a dataset, and the communication may be intercepted by the task interceptor and passed to the storage layer as is. Alternatively, the communication may be a direction from the task interceptor to pull a stored insight from the storage layer.

At block 306, the storage layer provides the insight corresponding to the dataset to be operated on by the application to the application layer, e.g. to the application residing in the application layer. Therefore, instead of performing the computation within the application layer to generate the requested insight, the computation may be proactively computed within the storage layer prior to a request to do so from the application residing in the application layer, and provided to the application from the storage layer responsive to a request from the application layer.

Method 300 may be implemented on system 200 of FIG. 2. Specifically, insight of second dataset 250 and lineage data associated with insight of second dataset 250 may be stored within storage layer 220. Task receptor 260 may receive a communication associated with insight of second dataset 250 from application layer 210, e.g., from task interceptor 214 within application layer 210. Responsive to receiving the communication, task receptor 260 may pass insight of second dataset 250 to application layer 210. In an example, application 212 may receive insight of second dataset 250 without performing a computation on second dataset 224 within application layer 210.

Figure 4:
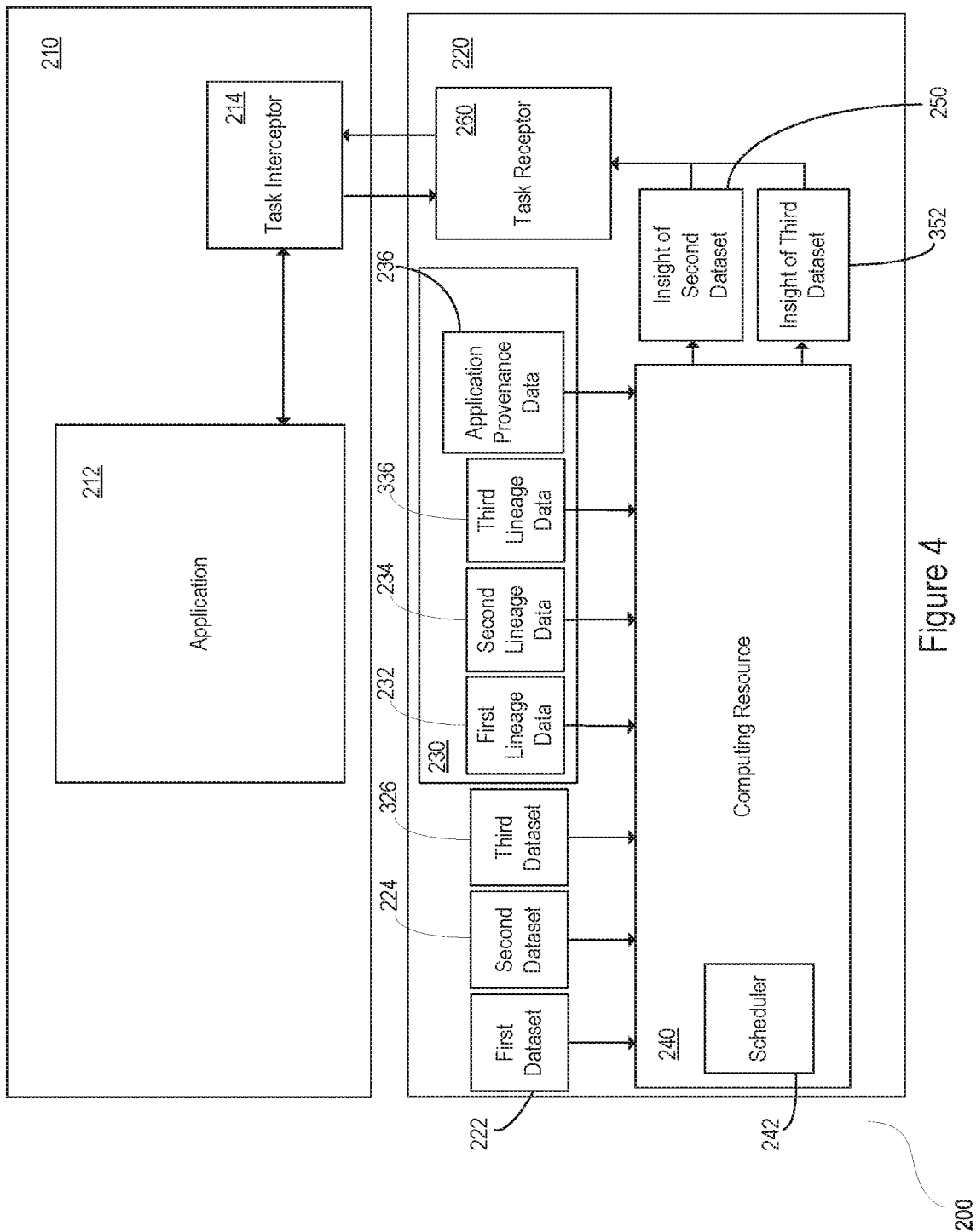
FIG. 4 is a block diagram further illustrating a system according to some examples.

In an example, the request of application 212 to generate an insight may be a combination of insights stored within storage layer 220. FIG. 4 is an example system 400 for merging insights of datasets and providing the merged insight to an application layer. System 400 may include similar architecture to that of system 200. For clarity and conciseness, some of the components of system 400 may be described with reference to FIG. 2, including application layer 210 having application 212 and task interceptor 214, storage layer 220 having first dataset 222, second dataset 224, and corresponding first lineage data 232 and second lineage data 234 stored in metadata store 230. Application provenance data 236 is further provided as well as computing resource 240 having scheduler 242 to generate insight of second dataset 250. As described previously, computing resource 240 may fetch, decode, and execute instructions stored within storage layer 220, or any computer readable medium, to perform the functionalities described in relation to instructions stored within storage layer 220.

In addition to first dataset 222 and second dataset 224, third dataset 326 is provided in system 300 with corresponding third lineage data 336 stored in metadata store 230. In addition to scheduler 242 determining that second lineage data 234 meets a similarity criterion with first lineage data 232, as described in system 200, scheduler 242 may also determine that third lineage data 336 meets a 10o similarity criterion with first lineage data 232. Scheduler 242 may direct computing resource 240 to perform a computation on third dataset 326 using application provenance data 236 in addition to directing computing resource 240 to perform a computation on second dataset 224 using application provenance data 236. Upon performing the computation on second dataset 224 and third dataset 326, computing resource 240 may generate an insight of second dataset 250 and an insight of third dataset 352 respectively.

As described at block 304 in FIG. 3, a communication associated with an insight may be received from an application layer. For example, application 212 in FIG. 4 may attempt to generate an insight from a dataset which may include both second dataset 224 and third dataset 326, e.g. where second dataset 224 and third dataset 326 are separate files in a directory to be analyzed, where second dataset 224 represents data taken at a first point in time and third dataset represents data taken at a second point in time, where second dataset 224 and third dataset 326 are subsets of a whole dataset, etc. Responsive to the request, task receptor 260 may, for example, receive a communication from task interceptor 214 to provide the insight to application 212. Task receptor 260 may respond to this received communication by merging insight of second dataset 250 with insight of third dataset 352 and providing the merged insight to application 212.

Figure 5:
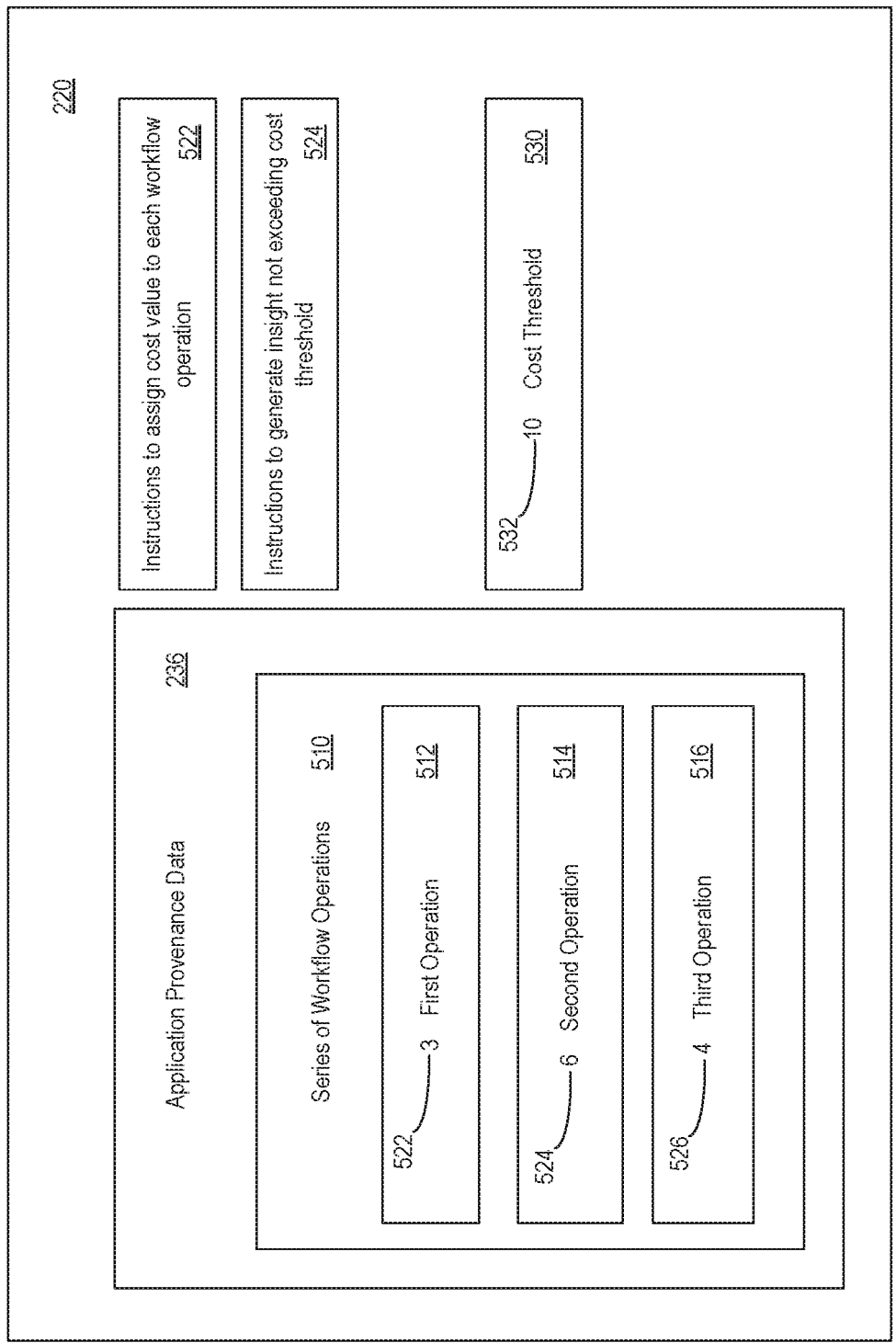
FIG. 5 is a block diagram further illustrating a system according to some examples.

In an example, the insight provided to application 212 is an output of a partial computation of a series of workflow operations. FIG. 5 is a block diagram illustrating an example system 500 for generating a partial insight, i.e., an insight that may be an output of a partial computation of a series of workflow operations. FIG. 5 may incorporate some of the architecture of FIG. 2 and FIG. 4, including storage layer 220 and application provenance data 236. In an example, application provenance data 236 may include a series of a workflow operations, such as series of workflow operations 510. Sample workflow operations are illustrated, including first operation 512, second operation 514, and third operation 516. While three such operations are illustrated, any number of operations may be included in the series of workflow operations. In an example, first operation 512 is a first transformation to be applied to a dataset, second operation 514 is a second transformation to be applied to a dataset, and third operation 516 is a third transformation to be applied to a dataset.

A computing resource, such as computing resource 240 of FIG. 2, may be provided to fetch, decode, and execute instructions stored within storage layer 220, or any computer readable medium, to perform the functionalities described in relation to instructions stored within storage layer 220. In an example, instructions 522 are provided to assign a cost value to each workflow operation of the series of workflow operations. In an example, the cost value assigned to each workflow is a cost as applied to a dataset, e.g. taking into account a size of the dataset, a computational cost of applying the operation to the dataset, etc. For example, first operation 512 may be assigned a cost value of three 522 as applied to the dataset, second operation 514 may be assigned a cost value of six 524 as applied to the dataset, and third operation 516 may be assigned a cost value of four 526 as applied to the dataset. In an example, instructions 524 may be provided to generate an insight, the insight being an output of the series of workflow operations partially computed such that the resource threshold is not exceeded.

In this example, a cost threshold 530 of ten 532 is provided. In an example, the value of cost threshold 530 may correspond to the availability of computational resources within storage layer 220. As another example, the value of cost threshold 530 may correspond to the availability of resource space within storage layer 220, such as the resource space available for the storage of a generated insight. In yet another example, the value of cost threshold 530 may correspond to network availability, such as the bandwidth of a network in communication with storage layer 220.

The resources available to storage layer 220 for proactively generating an insight within storage layer 220 may be controlled and dynamically allocated. Thus, where less computational processing power is allocated to computational resources within storage layer 220 for generating an insight, cost threshold 530 may be lowered. Similarly, where less storage space is allocated to storage space within storage layer 220, cost threshold 530 may be lowered. Conversely, the cost threshold may be raised where more resources are allocated to storage layer 220.

The resources allocated to storage layer 220 for proactively generating an insight within storage layer 220 may be controlled manually e.g. by a user through a user interface provided by an application framework of storage layer 220. As another example, the availability of resources within storage layer 220 may be monitored and the allocation of resources to storage layer 220 for proactively generating an insight within storage layer 220 may be adjusted automatically based on available resources within storage layer 220. For instance, where the available resources within storage layer 220 decreases, the allocation of resources allocated to the proactive generation of insights may be decreased. In an example, the allocation of resources is automatically adjusted through an application framework within storage layer 220.

In an example, a generated insight is an output of series of workflow operations 510 partially performed on a dataset such that cost threshold 530 is not exceeded. For instance, a computation may be performed on a dataset within storage layer 220, e.g. second dataset 224 of FIG. 2. Specifically, first operation 522 may have a cost value of 3 as applied to a dataset and first operation 522 may be performed on the dataset. Second operation 514 may have a cost value of 6 as applied to the dataset and second operation 514 may be performed on the dataset. However, because applying third operation 516 having a cost value of 4 as applied to the dataset may exceed the cost threshold, given 3+6+4>10, third operation 516 may not be performed on the dataset. Thus, an insight may be generated that is the output of first operation 512 and second operation 514 of series of workflow operations 510 operating on a dataset. In an example, the generated insight may be provided to an application, along with lineage data of the operations already computed on the generated insight, and the operations of the series of workflow operations not computed in the storage layer, such as third operation 516 from the previous example, may be performed on the provided insight by the application within the application layer. Thus an insight may be generated by a computation partially performed within a storage layer and partially performed in an application layer.

Generated insights may be stored along with lineage data of the generated insights. In an example, stored insights may be stored at varying storage tiers within a storage layer. For example, a first insight may be stored in a faster and/or more expensive tier than a second insight. In an example, stored lineage data may indicate the frequency at which an insight is requested, and insights may be placed within storage tiers of varying expense corresponding to the frequency at which an insight is requested.

Figure 6:
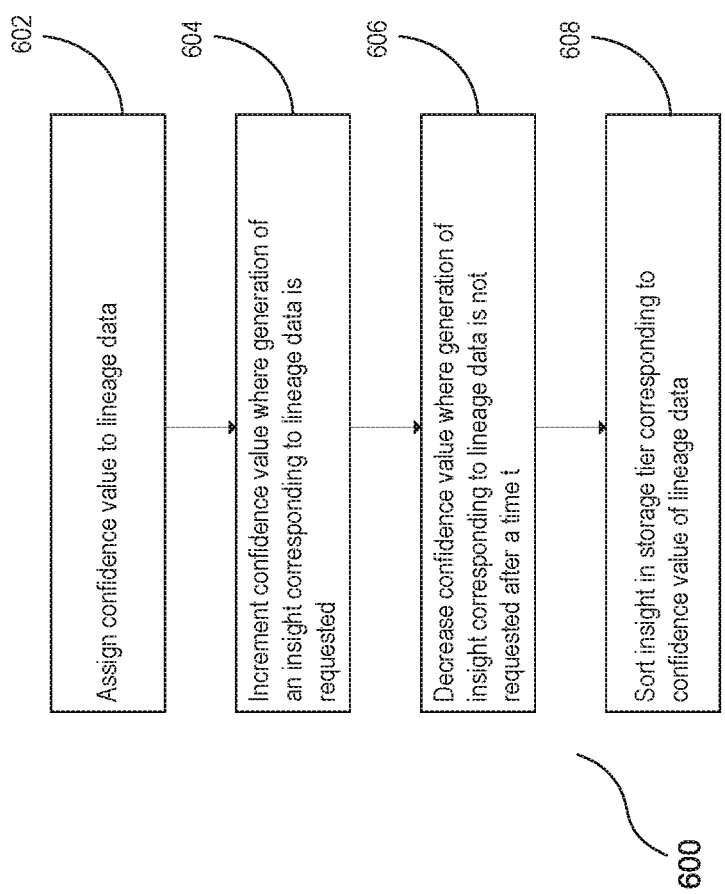
FIG. 6 is a flowchart further illustrating a method according to some examples.

FIG. 6 is an example method 600 for sorting insights in storage tiers corresponding to the frequency at which an insight is requested, e.g. by an application. Example method 600 may be implemented at least by a processor executing instructions on a computer readable storage medium. At block 602, stored lineage data of each stored dataset is assigned a confidence value, which may be stored with the lineage data. In an example, the confidence value corresponds to a value of the lineage data to which the confidence value is assigned, e.g. the frequency at which an insight is requested, whether the insight has been requested recently, i.e. within a given time window, etc. For instance, at block 604 the confidence value of lineage data of a first insight may be incremented where a computation is performed on a first dataset to generate the first insight. At block 606 for example, a confidence value of lineage data may be decreased where an insight corresponding to the lineage data is not requested after a period of time. Thus, the confidence value of lineage data may be an indicator as to the value of the lineage data, such as a frequency at which a request occurs to generate an insight corresponding to the lineage data.

At block 608, an insight may be sorted into a storage tier corresponding to a confidence value of respective lineage data. For example, a first insight having first lineage data with a higher assigned confidence value than a second insight having second lineage data may be stored in a higher tier, e.g. a storage tier that is faster and/or closer to a processor, yet more expensive. Insights determined to be more valuable may therefore reside in higher, more expensive storage tiers than insights determined to be less valuable. Accordingly, confidence values assigned to the lineage data of insights may be utilized to sort insights within storage tiers of varying expense.

Figure 7:
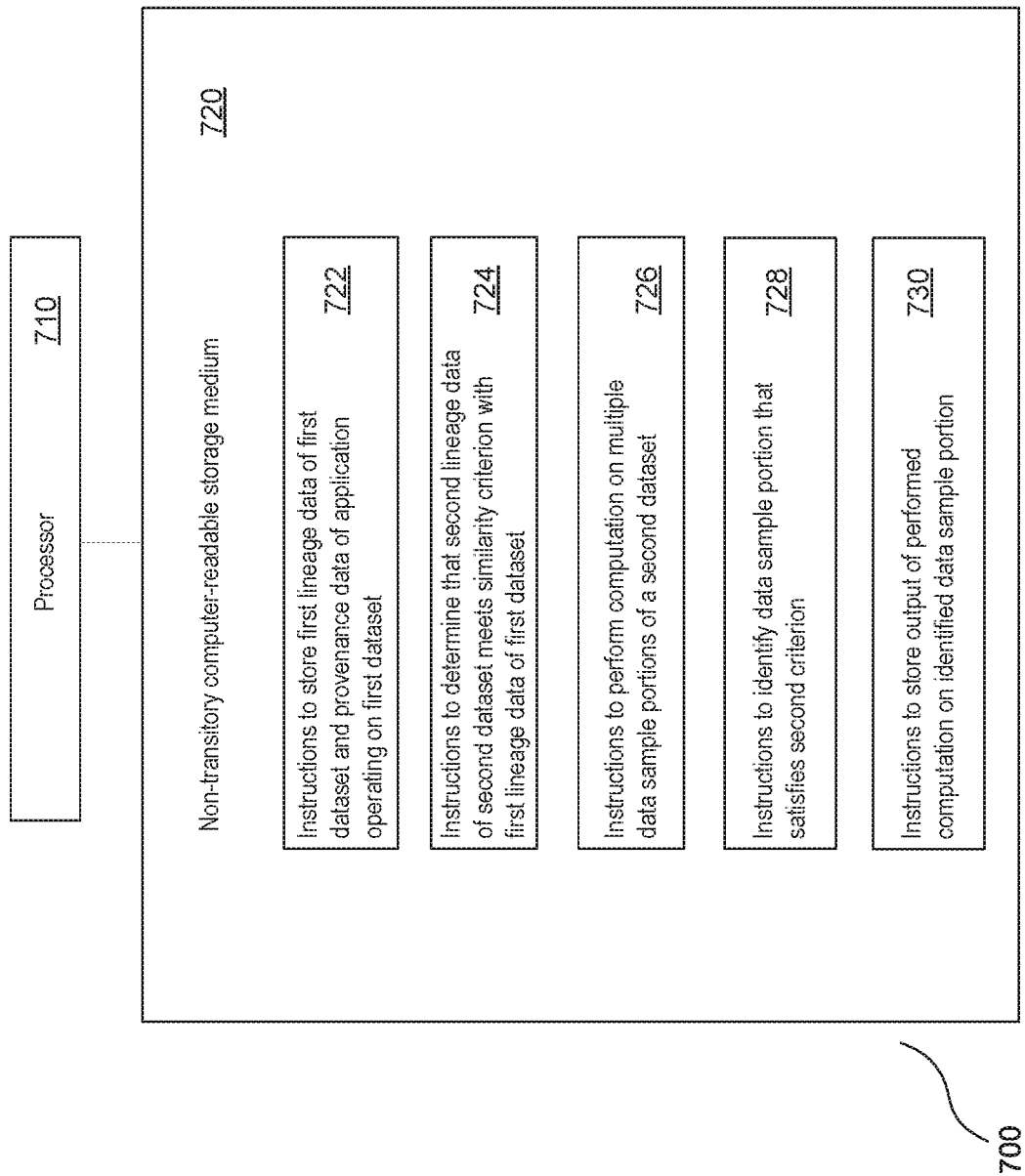
FIG. 7 is a block diagram illustrating a non-transitory computer readable medium according to some examples.

Insights approximating an insight requested by an application may be provided to the application from a storage layer. FIG. 7 is an example non-transitory computer readable medium 720 for storing an approximate insight using data sample portions of a dataset. Example processor 710 is provided and may be in communication with non-transitory computer-readable storage medium 720 for executing instructions stored thereon. Specifically, instructions 722 may be provided for storing first lineage data of a first dataset and provenance data of an application operating on the first dataset, e.g. within a storage layer. Instructions 724 may also be provided for predicting that the application operating on the first dataset will attempt to operate on a second dataset by determining that second lineage data of the second dataset meets a similarity criterion with the first lineage data of the first dataset. For example, the second lineage data of the second dataset may meet the similarity criterion with the first lineage data of the first dataset where the second dataset shares a similar origin with the first dataset and/or the second dataset was derived from the same source as the first dataset. In another example, the similarity criterion may be met where the second dataset and the first dataset share a storage path, had been operated on by a common workflow, have similar structure, etc.

Instructions 726 may be provided for performing a computation on the second dataset using the provenance data of the application, such as a series of workflow operations of the application. Specifically, the performed computation includes operating on multiple data sample portions of the second dataset. In an example, the multiple data sample portions may vary in size, and different sample portions may be derived from different sampling strategies. For example, a first data sample portion of the multiple data sample portions may be determined using a first sampling strategy, and a second data sample portion of the multiple data sample portions may be determined using a second sampling strategy different from the first sampling strategy. In an example, data sample portions, even data sample portions determined from different sampling strategies, may include any number of the same data samples. In an example, various sampling strategies may be stored within the storage layer for the determination of multiple data sample portions. In an example, a data sample portion of the multiple data sample portions is a subset of the second dataset, such that a generated insight from the data sample portion would be an approximation of a generated insight from the second dataset.

In an example, the multiple data sample portions may be compared to various criteria. Instructions 728 may be provided to identify a data sample portion of the multiple data sample portions that satisfies a criterion. The criterion may be based on the provenance data of the application, for example an error metric of the application. For example, the criterion may be an acceptable error threshold determined from the error metric of the application. The error metric of the application may include a tolerable error margin, a method to compute the accuracy of a particular result, etc.

In another example, the criterion may be based on a data sample size of a data sample portion as compared to other data sample portions, or an error rate of a generated insight of a data sample portion as compared to the error rate of generated insights of other data sample portions, or any combination thereof. For instance, the criterion may be satisfied for a data sample portion of the multiple data sample portions that meets the acceptable error threshold determined from the error metric of the application, and is the smallest of the data sample portions of the multiple data sample portions that satisfy the acceptable error threshold. In another example, the criterion may be satisfied for a data sample portion of the multiple data sample portions whose insight both meets the acceptable error threshold determined from the error metric of the application, and exhibits the lowest error rate among insights of the multiple data sample portions that satisfy the acceptable error threshold. The criterion may also be based on relative weights assigned to the size of a data sample portion, the error rate of an insight of a data sample portion, etc., such that a data sample portion exhibiting some combination of favorable characteristics, e.g. relative small size and/or low generated error rate, may satisfy the criterion.

Instructions 730 may be provided for storing an insight of the second dataset generated from the performed computation. In an example, the insight is an output of the performed computation on the sample portion identified by instructions 728. Lineage data of the generated insight may also be stored. In an example, insights may be generated for each of the multiple data sample portions, even those not satisfying the criterion. The insights of each of the multiple data sample portions may be stored, and in an example, the insight of a data sample portion having satisfied the criterion may be stored in a higher storage tier than an insight of a data sample portion not having satisfied the criterion, and/or data samples from the second dataset not part of the data sample portion having satisfied the criterion. For example, an insight of a first data sample portion exhibiting a lower error rate than an insight of a second data sample portion may be sorted into a higher storage tier than the insight of the second data sample portion. As another example, an insight of a first data sample portion that satisfies the error metric of the application may be sorted into a higher storage tier than an insight of a second data sample portion that does not satisfy the error metric of the application. The stored insight may be provided to the application in response to receiving a communication from the application, such as a request to generate the stored insight, a request to provide the second dataset to the application as input, etc. In an example, an insight stored within a higher storage tier may be provided to the application faster than an insight stored within a lower storage tier.

In an example, the sampling strategy used to determine a data sample portion satisfying the criterion may be saved such that the sampling strategy may be implemented on additional datasets. Specifically, the saved sampling strategy may be implemented on a dataset having lineage data meeting a similarity criterion with the lineage data of the dataset on which the sampling strategy was used to determine the data sample portion that satisfied the criterion. For example, a first sampling strategy may be used on a first dataset to determine a first data sample and a second sampling strategy may be used on the first dataset to determine a second data sample. It may be determined that the first data sample satisfies a criterion but that the second data sample does not satisfy the criterion. For determining the data sample that satisfied the criterion, the first sampling strategy may be saved. The first sampling strategy may then be implemented on any additional dataset with lineage data sharing a similarity criterion with lineage data of the first dataset. In an example, once the first sampling strategy is saved, other sampling strategies other than the saved sampling strategy may not be implemented for datasets with lineage data sharing a similarity criterion with lineage data of the first dataset.

Figure 8:
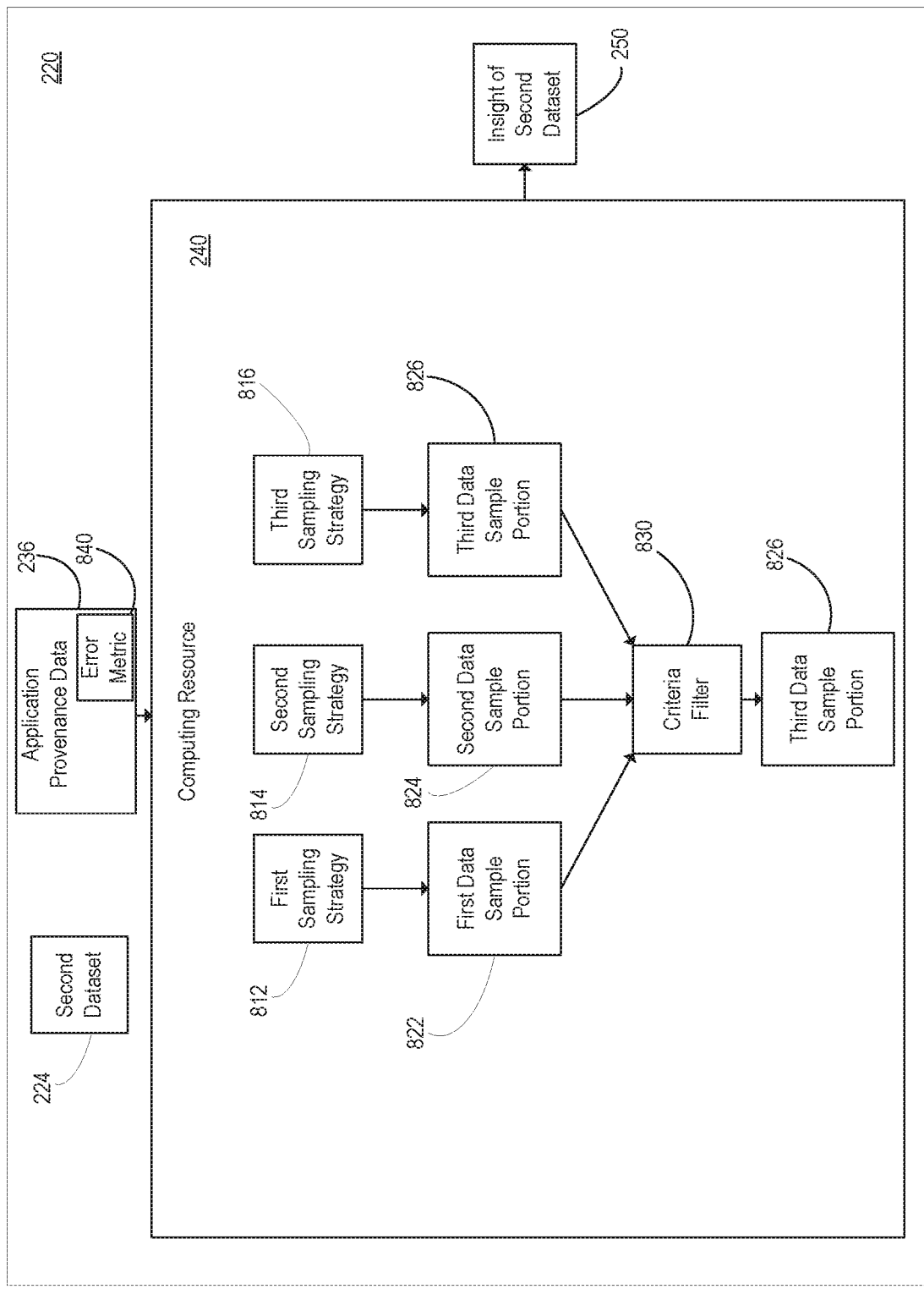
FIG. 8 is a block diagram further illustrating a system according to some examples.

FIG. 8 is an example system 800 for generating an approximate insight using data sample portions of a dataset. System 800 may include similar architecture to that of system 200. For clarity and conciseness, some of the components of system 800 may be described with reference to FIG. 2, including storage layer 220, computing resource 240, second dataset 224, application provenance data 236, and insight of second dataset 250. As described previously, computing resource 240 may fetch, decode, and execute instructions stored within storage layer 220, or any computer readable medium, to perform the functionalities described in relation to instructions stored within storage layer 220.

Computing resource 240 within storage layer 220 may ingest application provenance data 236. In an example, provenance data 236 of application 212 may include an error metric, which may include a tolerable error margin, a method to compute the accuracy of an operation, parameters to tune and validate a data model, etc. Responsive to predicting the application will attempt to generate an insight from second dataset 224, e.g. as described at block 724 in FIG. 7, computing resource 240 may generate an approximate insight from second dataset 224 to provide to the application. Specifically, computing resource 240 may implement first sampling strategy 812 to generate first data sample portion 822, second sampling strategy 814 to generate second data sample portion 824, and third sampling strategy 816 to generate third data sample portion 826.

In an example, first data sample portion 822, second data sample portion 824, and third data sample portion 826 may be subsets of second dataset 224. First data sample portion 822, second data sample portion 824, and third data sample portion 826, may be data subsets of varying size, and each data sample portion may be a different subset of second dataset 224. Any data portion may include any number of like data samples. Each data sample portion may, for example, be passed through criteria filter 830 and it may be determined from criteria filter 830 which of the data sample portions meets a criterion.

In an example, criteria filter 830 is machine readable code of computing resource 240. Criteria filter 830 may determine whether an insight of first data sample portion 822, an insight of second data sample portion 824, or an insight of third data sample portion 826 meets an error threshold as determined by error metric 840 of application provenance data 236. For example, computing resource 240 may operate on first data sample portion 822, second data sample portion 824, and third data sample portion 826, using application provenance data 236, such as a series of workflow operations of the application. Computing resource 240 may generate an insight from each of the data sample portions and those insights may be passed through criteria filter 830 to determine which of the generated insights satisfies the error threshold as determined by error metric 840.

In another example, criteria filter 830 may determine which of first data sample portion 822, second data sample portion 824, or third data sample portion 826 is the smallest subset of second dataset 224 having an insight satisfying the error threshold as determined by error metric 840. In yet another example, criteria filter 830 may determine which of first data sample portion 822, second data sample portion 824, or third data sample portion 826 has an insight with the lowest error rate among the data sample portions. In this example, third data sample portion 826 was identified by criteria filter 830 as satisfying the criterion.

Insight of second dataset 250 may be generated, the insight of second dataset 250 being the output of computing resource 240 performing a computation, such as a series of workflow operations, on identified third data sample portion 826 using application provenance data 236. In an example, third data sample portion 826 may a subset of second dataset 224 and the insight of second dataset 250 may be an insight approximating the insight that would be generated by computing resource 240 operating on second dataset 224 using application provenance data 236. In an example, the generated insight may be stored within storage layer 220 and provided to the application upon request. In an example, third sampling strategy 816 is stored within storage layer 220 and third sampling strategy 816 may determine a data sample portion of any dataset identified by computing resource 240 as having lineage data sharing a similarity criterion with lineage data of second dataset 224. In this way, computing resource 240 may determine a sampling strategy to be used on datasets having lineage data that shares a similarity criterion with other datasets.

Figure 9:
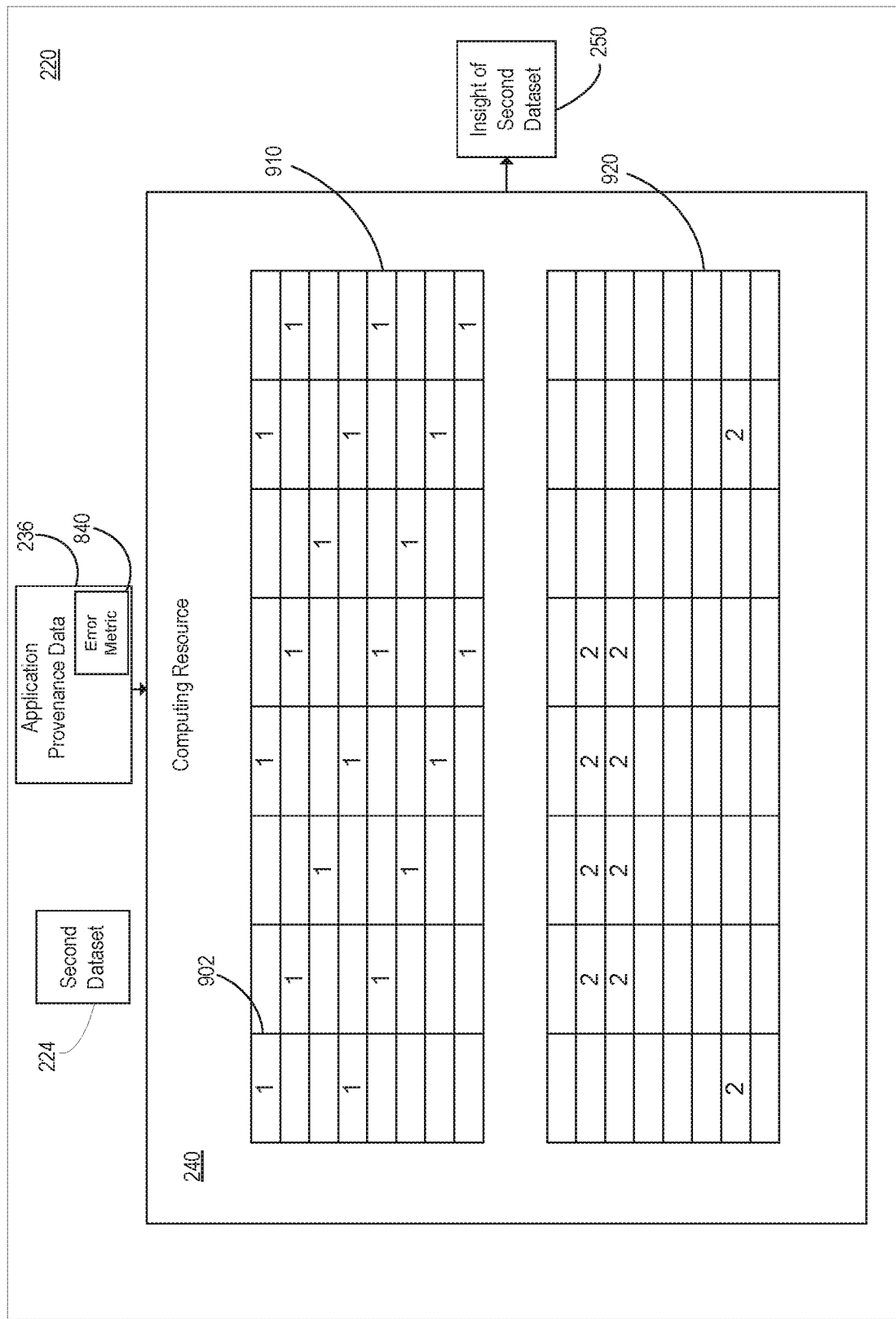
FIG. 9 is a block diagram further illustrating a system according to some examples.

FIG. 9 is an example system 900 for generating an insight using sampling strategies to determine data sample portions. System 900 may include similar architecture to that of system 200 and system 800. For clarity and conciseness, some of the components of system 900 may be described with reference to FIG. 2 and FIG. 8, including storage layer 220, computing resource 240, second dataset 224, application provenance data 236, and insight of second dataset 250 of system 200, and error metric 840 of system 800.

Two example sampling strategies are provided within computing resource 240, and both sampling strategies are implemented on the data of second dataset 224. Computing resource 240 specifically includes an example first sampling strategy implemented on the second dataset 910 and an example second sampling strategy implemented on the second dataset 920. First sampling strategy 910 and second sampling strategy 920 are merely illustrative and any number of different sampling strategies may be implemented. These sampling strategies may be implemented to determine data sample portions that, when operated upon, may generate insights that are approximate insights to an insight generated from second dataset 224 when operated upon as a whole.

A data sample in this example is illustrated as one cell of the dataset, such as data sample 902. A number 1 indicates a data sample included in a first data sample portion by first sampling strategy implemented on the second dataset 910. A number 2 indicates a data sample included in a second data sample portion by second sampling strategy implemented on the second dataset 920. As illustrated in system 900, first sampling strategy implemented on the second dataset 910 determines a data sample portion including a dispersed set of data samples, while second sampling strategy implemented on the second dataset 920 determines a data sample portion including a more concentrated set of data samples. In this example, the first sampling strategy determines a data sample portion of a first size, the first size including twenty data samples, while the second sampling strategy determines a data sample portion of a second size, the second size including ten data samples. A sampling strategy however, may determine a data sample portion of varying size depending on the dataset on which it is implemented. In other examples, first sampling strategy and second sampling strategy may determine like data sample portions of like size.

The first data sample portion and the second data sample portion, when operated upon by computing resource 240 using application provenance data 236, may generate insights exhibiting different errors. Specifically, a first insight as determined from the first sample portion may exhibit a first error and the second insight as determined from the second sample portion may exhibit a second error. Any number of reasons may account for why the first error of the first insight may be different from the second error of the second insight, including, the first sample portion being a larger data sample portion than the second sample portion, the first sample portion including different samples than the second sample portion, the first sample portion including a more dispersed set of data samples than the second sample portion, etc.

Depending on the distribution of data samples within second dataset 224, either the first sample portion or the second sample portion may be a more representative sample of second dataset 224. Data samples of interest within a dataset, e.g. data samples indicating more anomalous behavior than other data samples within a dataset, may have more significance than other data samples within the dataset. A sampling strategy that determines a data sample portion failing to substantially capture data samples of interest within a dataset may result in a generated insight of greater error than a sampling strategy that substantially captures data samples of interest within the dataset. Therefore, employing multiple sampling strategies may aid in identifying a data sample portion that substantially captures data samples of interest within a dataset.

In another example, data samples of interest may be specified by application provenance data 236, and a sampling strategy that determines a data sample portion capturing these data samples of interest may be employed. For example, computing resource 240 may identify from application provenance data 236 data samples of interest in the top left quarter of second dataset 224. Responsive to this identification, computing resource 240 may employ the second sampling strategy to capture the data samples of interest within second dataset 224 and determine the second sample portion.

Computing resource 240 may perform a computation on the first data sample portion or the second data sample portion using application provenance data 236. A first insight may be generated from the first data sample portion and a second insight may be generated from the second data sample portion. The error of the first generated insight and the error of the second generated insight may be compared to a criterion, such as an error threshold as determined from error metric 840. A data sample portion of the first data sample portion or the second data sample portion may be identified for satisfying the criterion. In an example, the insight associated with the identified data sample portion, e.g. insight of second dataset 250, may be stored and provided to the application.

In an example, the data sample portion identified for satisfying the criterion may be stored in a higher, more expensive storage tier than data samples of second dataset 224 not included in the data sample portion identified for satisfying the criterion. In another example, insight of second dataset 250 may be stored in a higher, more expensive storage tier than second dataset 224. Insight of second dataset 250 may be smaller than second dataset 224, and may be requested more frequently by an application in an application layer. Therefore, it may be more efficient to store insight of second dataset 250 in a higher storage tier than second dataset 224.

Figure 10:
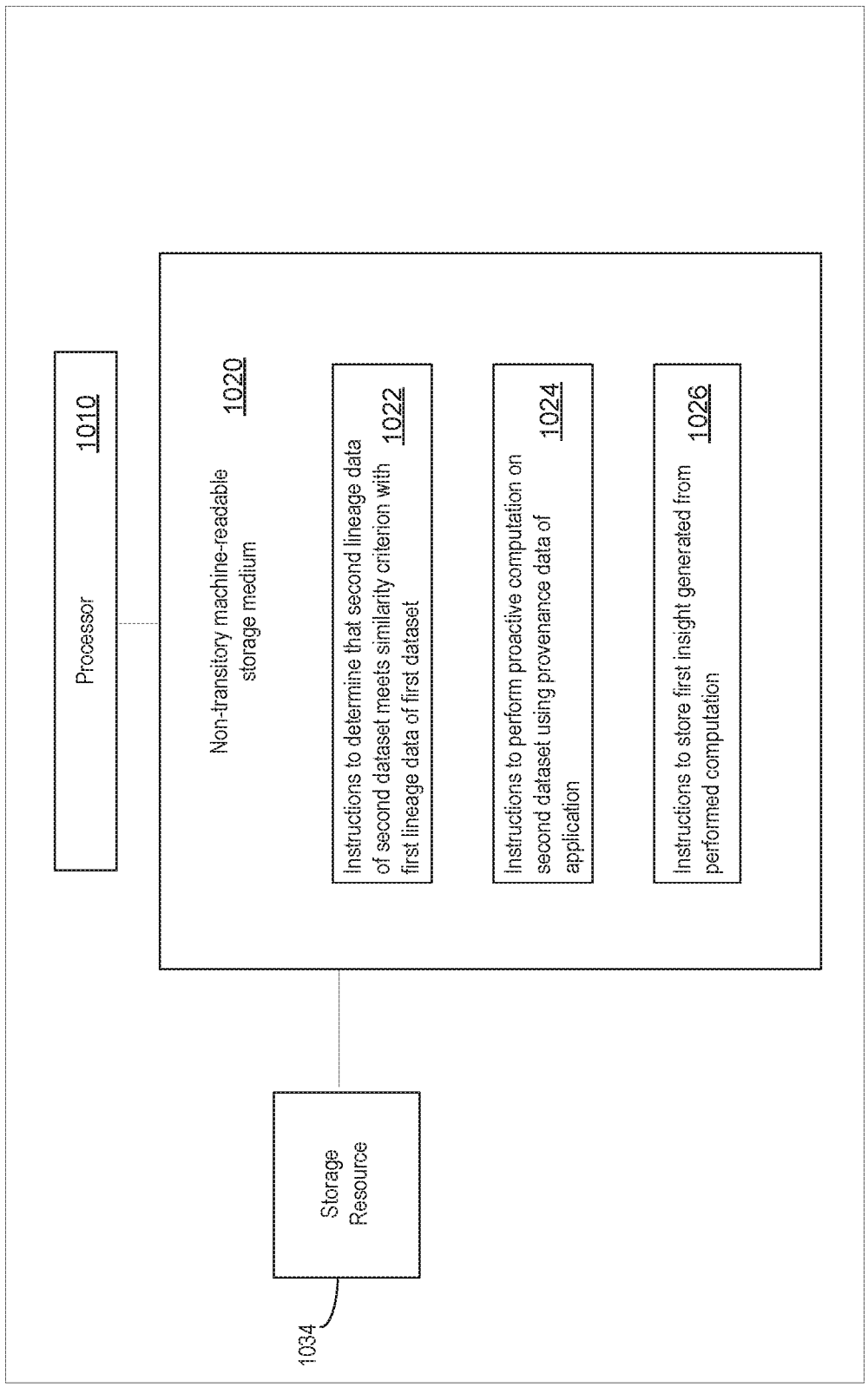
FIG. 10 is a block diagram further illustrating a system according to some examples.

FIG. 10 is an example system 1000 for generating an insight. In an example, a storage resource 1034 is provided for storing first lineage data of a first dataset within a storage layer, e.g. storage layer 210 of FIG. 2. The lineage data may include, for example, an origin of the first dataset, a workflow applied to the first dataset, a storage path of the first dataset, etc. Provenance data of an application operating on the first dataset may also be stored within storage resource 1034, and may include, for example, a series of workflow operations of the application as applied to the first dataset, the source path of the first dataset, the location of the first insight generated by the application workflow operating on the first dataset, etc.

A processor 1010 may also be provided in system 1000, and may execute instructions stored in non-transitory machine-readable storage medium 1020. Executable instructions within non-transitory machine-readable storage medium 1020 may include instructions to determine that second lineage data of a second dataset meets a similarity criterion with the first lineage data of the first dataset. In an example, the second dataset and second lineage data may be stored within storage resource 1034. Whether the application operating on the first dataset will attempt to operate on the second dataset may be predicted by determining whether the second lineage data of the second dataset meets a similarity criterion with the first lineage data of the first dataset. For example, second lineage data and first lineage data may include an origin of second dataset and first dataset respectively. It may be predicted that the application operating on the first dataset will attempt to operate on the second dataset where the second dataset shares an origin with the first dataset.

Instructions 1024 may be provided to perform a proactive computation on the second dataset using the provenance data of the application. In an example, the computation is performed responsive to determining that the second lineage data of the second dataset meets a similarity criterion with the first lineage data of the first dataset. In an example, the provenance data includes a series of workflow operations of the application used to operate on the first dataset. By using the provenance data of the application to perform a computation on the second dataset, the series of workflow operations used to operate on the first dataset may be used to operate on the second dataset.

Instructions 1026 may be provided to store a first insight generated from the performed computation. In an example, the first insight may be provided to an application within an application layer in response to the application attempting to generate the first insight from the second dataset. Thus, the series of workflow operations an application may attempt to perform in the application layer may be proactively performed within a storage layer, e.g. storage layer 210.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

We claim:

1. A method comprising:
storing first lineage data of a first dataset and provenance data of an application at an application layer operating on the first dataset in a storage system;
determining, by a computing resource collocated within the storage system, that second lineage data of a second dataset meets a similarity criterion with the first lineage data of the first dataset;
in response to the determination, performing a proactive computation on the second dataset using the provenance data of the application, wherein the proactive computation is at least a partial processing of the second dataset for generating an insight performed without being prompted to do so by a request from the application layer; and
generating the insight of the second dataset from the performed computation.

2. The method of claim 1, further comprising storing the insight of the second dataset and third lineage data of the generated insight of the second dataset in the storage system.

3. The method of claim 1, wherein the provenance data of the application comprises a series of workflow operations of the application, or the location of an insight of the first dataset generated by the application workflow operating on the first dataset.

4. The method of claim 1, wherein the first lineage data comprises an origin of the first dataset, a workflow applied to the first dataset, or a storage path of the first dataset.

5. The method of claim 1, wherein the application is within an application layer of a computing system.

6. The method of claim 5, further comprising:
receiving a communication associated with the insight of the second dataset from the application layer; and
wherein the insight of the second dataset is provided to the application responsive to receiving the communication.

7. The method of claim 6, wherein the received communication is a request of the application to perform a computation on the second dataset to generate the insight of the second dataset.

8. The method of claim 1, further comprising:
performing a proactive computation on a third dataset using the provenance data of the application; and
merging an insight of the third dataset with the insight of the second dataset.

9. The method of claim 1, wherein the provenance data of the application is a series of workflow operations, and further comprising assigning a cost value to each of the workflow operations in the series upon performing the computation on the second dataset.

10. The method of claim 9, wherein the series of workflow operations in total exceeds a cost threshold, and wherein the insight of the second dataset is an output of the series of workflow operations partially computed such that the cost threshold is not exceeded.

11. The method of claim 1, further comprising:
assigning a confidence value to the third lineage data of the generated insight of the second dataset, wherein the confidence value corresponds to a determined value of the third lineage data; and
sorting the insight of the second dataset in a storage tier corresponding to the confidence value of the third lineage data.

12. The method of claim 11, wherein the determined value of the third lineage data is a frequency at which a request to generate the insight of the second dataset occurs.

13. A non-transitory computer readable medium having instructions executable by a processor to:
within a storage system,
store first lineage data of a first dataset and provenance data of an application operating on the first dataset;
predict that the application operating on the first dataset will attempt to operate on a second dataset by determining that second lineage data of the second dataset meets a similarity criterion with the first lineage data of the first dataset;
in response to the prediction, perform a proactive computation on the second dataset using the provenance data of the application, wherein the computation comprises operating on multiple data sample portions of the second dataset, and wherein the proactive computation is at least a partial processing of the second dataset for generating an insight performed without being prompted to do so by a request from the application;
identify a data sample portion of the multiple data sample portions that satisfies a second criterion; and
store the insight of the second dataset generated from the performed computation, wherein the insight is the output of the performed computation on the identified data sample portion.

14. The non-transitory computer readable medium of claim 13, wherein the provenance data of the application comprises an error metric of the application.

15. The non-transitory computer readable medium of claim 14, wherein the second criterion is meeting an error threshold according to the error metric of the application.

16. The non-transitory computer readable medium of claim 15, wherein the multiple data sample portions comprises a first data sample portion determined using a first sampling strategy, and a second data sample portion determined using a second sampling strategy different from the first sampling strategy.

17. The non-transitory computer readable medium of claim 16, wherein the second criterion is a data sample portion of the multiple data sample portions having a generated insight of the data sample portion with the lowest error rate among insights generated by the multiple data sample portions.

18. The non-transitory computer readable medium of claim 15, wherein the second criterion is a data sample portion of the multiple data sample portions being the smallest data sample portion among the multiple data sample portions satisfying the error threshold.

19. A storage system comprising:
   a storage resource for storing first lineage data of a first dataset and provenance data of an application at an application layer operating on the first dataset;
   a processor; and
   a non-transitory machine-readable storage medium comprising instructions executable by the processor to:
      predict that the application operating on the first dataset will attempt to operate on a second dataset by determining that second lineage data of a second dataset meets a similarity criterion with the first lineage data of the first dataset;
      in response to the prediction, perform a proactive computation on the second dataset using the provenance data of the application, wherein the proactive computation is at least a partial processing of the second dataset for generating an insight performed without being prompted to do so by a request from the application layer; and
      store the insight of the second dataset generated from the performed computation.

20. The storage system of claim 19, further comprising a task receptor to:
   receive a communication associated with the first insight; and
   provide the insight of the second dataset to the application responsive to the received communication.

* * * * *